United States Patent [19]

Anglin et al.

[11] Patent Number: 5,239,647
[45] Date of Patent: Aug. 24, 1993

[54] DATA STORAGE HIERARCHY WITH SHARED STORAGE LEVEL

[75] Inventors: Matthew J. Anglin; Gregory J. Tevis; Donald P. Warren, all of Tucson, Ariz.

[73] Assignee: International Business Machines Corporation, Armonk, N.Y.

[21] Appl. No.: 578,388

[22] Filed: Sep. 7, 1990

[51] Int. Cl.⁵ .............................................. G06F 15/40
[52] U.S. Cl. .............................. 395/600; 364/DIG. 1; 364/222.81
[58] Field of Search ................. 364/DIG. 1, DIG. 2; 395/200, 600, 425, 725

[56] References Cited

U.S. PATENT DOCUMENTS

| | | | |
|---|---|---|---|
| 4,638,424 | 1/1987 | Beglin et al. | 364/200 |
| 4,718,005 | 1/1988 | Feigenbaum et al. | 395/200 |
| 4,771,375 | 9/1988 | Beglin et al. | 364/200 |
| 4,825,354 | 4/1989 | Agrawal et al. | 395/600 |
| 4,851,988 | 7/1989 | Trottier et al. | 395/200 |
| 4,876,662 | 10/1989 | Pence | 364/900 |
| 4,891,785 | 1/1990 | Donohoo | 395/600 |
| 4,999,766 | 3/1991 | Peters et al. | 395/600 |
| 5,001,628 | 3/1991 | Johnson et al. | 395/600 |

Primary Examiner—Paul V. Kulik
Assistant Examiner—John Loomis
Attorney, Agent, or Firm—M. W. Schecter

[57] ABSTRACT

A data storage hierarchy which inherently allows for a level 1 storage file to be uniquely identified across an entire network is disclosed. A directory naming convention is employed which includes an internal identifier and a name for each subdivision of the network. Because each file can be uniquely identified across the network, a single level 1 storage space in a file space, or a directory therein, can be used for the entire network. Also, because of the inherent uniqueness of the naming system, common DASD control files otherwise required to map between level 1 storage files and their level 0 source files can be eliminated.

7 Claims, 3 Drawing Sheets

DATA STORAGE HIERARCHY WITH SHARED STORAGE LEVEL

BACKGROUND OF THE INVENTION

1. Field of the Invention

The present invention relates to a data storage hierarchy with a shared storage level. More particularly, the invention relates to a data storage hierarchy in which a single level one storage space of a file space, or a directory therein, is shared across an entire network.

2. Discussion of the Related Art

Modern data processing systems include a host processor having one or more central processing units, a memory facility, an input/output system, and an interconnection system (i.e. a bus). The processor manipulates data stored in the memory according to instructions provided to it. The memory must therefore be capable of storing data required by the processor and transferring that data to the processor at a rate capable of making the overall operation of the computer feasible. The cost and performance of computer memory is thus critical to the commercial success of a computer system.

As computers manipulate ever increasing amounts of data they require larger quantities of data storage capacity. Computer memory is available in several forms. Generally, the faster data can be written to or read from a particular form of memory, the more expensive it is. Microchips are fast, but expensive, and are typically used as the primary or main memory in/to the host processor. Other available forms of memory are used as auxiliary or peripheral memory, and include numerous peripheral storage devices. For example, magnetic direct access storage devices (DASD), magnetic tape storage devices, and optical recording devices are all peripheral storage devices. These devices have a greater storage capacity and lower cost than main memory, but do not provide the same performance. For example, the time required to properly position a tape or disk beneath the read/write mechanism of a drive cannot compare with the rapid, purely electronic data transfer rate of main memory. It is, however, inefficient to store all of the data in a system in a single type of memory device. Simply storing all data in main memory is too costly and simply storing all data in a peripheral storage device significantly reduces performance. A physical portion of the total storage area of one or more peripheral storage devices is referred to as a "storage space".

A typical data processing system includes both main memory and one or more peripheral storage devices. A data processing system having a plurality of peripheral storage devices arranged hierarchically is referred to as a "data storage hierarchy". In a data storage hierarchy, primary or level 0 data storage generally refers to the level therein having the highest performance and lowest storage capacity. Secondary or level 1 (or lower level) storage includes the (equal or) greater storage capacity, but at (equal or) reduced performance and thus reduced cost. The unit of data storage can be data sets, files, or objects. Data set and file are terms used essentially interchangeably in different operating system environments to mean a collection of data in a prescribed arrangement and described by control information to which the system has access. An object is a variably sized byte stream with no record or other internal boundary orientation. For convenience, the term "file" is used hereinafter to refer generically to data sets, files, objects or any such data entities. Data is moved and copied between different levels of the hierarchy as files (or some larger unit of data), as required, to balance performance, storage and cost. Such data transfers and related actions to manipulate a data storage hierarchy (such as the deletion of data which is no longer being used from the hierarchy) to achieve this balancing is known as "storage management".

Storage management includes several subcomponents, such as performance management, reliability management, capacity management, space management and availability management. Each of these may involve the transfer of data between levels of the hierarchy. Space management is the movement of data between different levels of the hierarchy so as to store data only in the most appropriate level of the peripheral storage hierarchy. For example, relatively active data should be stored in a relatively high performing level of the hierarchy and relatively inactive data should be stored in a relatively lower performing level of the hierarchy. As data ages, it is generally referenced less (i.e. relatively less active) and should thus be moved to lower levels of the data storage hierarchy. The movement of data from one level of a data storage hierarchy to another is referred to as "migration", and may include data compaction to save storage space.

Availability management is the backup of data within a data storage hierarchy to improve the likelihood of its being available if and when it is needed by the host processor. The original or primary copy of the data is not deleted; an additional or secondary copy is generated and transferred to another portion of the data storage hierarchy. The secondary copy is typically stored on a different peripheral storage device from the primary copy to ensure the availability of the data. If the primary copy of the data becomes unavailable, such as by device failure, the secondary copy of the data may still be referenced. The secondary copy of the data need not be stored in a different level of the data storage hierarchy, but such may be desirable as the secondary copy is not likely to be as active as the primary copy. Data backup may occur unconditionally or incrementally. Unconditional backup generates a copy of any specified file, incremental backup copies only those files which have been updated since the previous secondary copy was generated. Note that transferring a file by migration may include the maintenance of a primary copy of a file in level 0 storage. The primary copy is, however, an empty file—the data in the file having been transferred to the secondary copy of the file in level 1 storage.

Storage management is traditionally performed manually. The data owner decides when to migrate or backup data, and where such migrated and backup files should be stored. Such decisions are time consuming, usually requiring a review of each file stored. The operations involved are often so time intensive that manual reviews and decisions are not made until there is no alternative. For example, a user might not migrate any files to level 1 storage until all storage space in level 0 storage is in use. In large systems, or in any system storing relatively large amounts of data, it is simply impractical to perform storage management manually.

In recent years, computer software has become available which reduces the need for manual operations. The IBM Data Facility Hierarchical Storage Manager (DFHSM) application program is an example of such software. DFHSM is a utility to the IBM Multiple Virtual Storage (MVS) series of operating systems. DFHSM uses specified management criteria to manage files, including the automatic recall of a transferred file upon an attempt to reference the file by a user. The management criteria include the minimum length of time a file will be permitted to be resident in the data storage hierarchy or a particular level thereof before it will be eligible to be migrated or deleted, or the maximum length of time a file will be permitted to exist without being backed up after being updated. Numerous management criteria are defined to the system and stored in a configuration file. The DFHSM management criteria are selected manually at the time of file identification to DFHSM. While DFHSM improves storage management, the manual selection of management criteria is still burdening.

In recent years, manual operations for storage management have been further reduced. System-managed storage is a term indicating that the system itself selects the management criteria for data and performs storage management. The storage administrator need only define the management criteria in a configuration file, the system itself selects the management criteria for a particular file upon its creation and manages it accordingly. An example of software providing system-managed storage is IBM Data Facility Storage Management Subsystem software, hereinafter referred to simply as DFSMS (DFSMS is a trademark of IBM Corporation). DFSMS is a subsystem of the IBM Multiple Virtual Storage (MVS) series of operating systems. DFSMS encompasses several subcomponents, including DFHSM and IBM Multiple Virtual Storage/Data Facility Product software, hereinafter referred to simply as MVS/DFP (MVS/DFP is a trademark of IBM Corporation).

DFSMS accomplishes the aforementioned with the addition of the automatic class selection (ACS) routine to MVS/DFP. The management criteria are defined in sets of such criteria (known by names such as storage and management classes, but hereinafter referred to simply as "management classes") in a configuration file and the ACS routine itself is defined once by the storage administrator for the system. As each file is identified to DFSMS, MVS/DFP uses the ACS routine to automatically select the management class therefor. ACS selects the management class based upon certain characteristics of a file, such as the name of the file, the owner of the file, the directory path to the file, and the size of the file. Once the ACS routine has selected the management class for a file, such management class is stored in one or more fields in a catalog existing in the host processor.

DFSMS must also provide for storage of the current data management attributes associated with each file. The management attributes are stored in one or more fields in the catalog, and/or the volume table of contents for each volume of data. The management attributes include certain data relating to the status and use of each file and are updated as such data changes during use. For example, the management attributes include the date and time a file became resident in the data storage hierarchy or a particular level thereof, the date and time a file was last accessed (whether the file was updated or not), and the date and time of last backup and update of the file.

One or more common DASD include one or more control files for storing control information also needed for storage management. These control files are not themselves managed by DFSMS, but may co-exist on common DASD with managed data files. A separate control file exists for each type of storage management activity (i.e. one control file for migration, one control file for backup, etc.). For example, a control file includes the information necessary to map migrated and secondary copies of files to their catalog and table of contents entries, and/or their primary copies (i.e. to their level 0 source files). Such mapping allows for recall of the correct migrated or secondary copy of a file upon specification of such file by a user. After determining that the primary copy of a file has been migrated, or that the secondary copy is required, the mapping data is used to locate and access the migrated or secondary copy of the file.

Actual storage management by DFSMS occurs during periods of relative system inactivity to minimize interference with other processing. During the prescribed periods, DFHSM is called to compare the management attributes of files to the management criteria of such files, as defined by the assigned management class. DFHSM then manages the files accordingly, transferring files and updating the management attributes and control information as required. In addition, storage management may be applied to units of data larger than a file. For example, a group of files having certain common management requirements may be established such that the entire group is managed as a whole. The group is assigned a management class of its own and managed accordingly. It should be understood that where files are hereinafter described as being managed during storage management, entire groups or other data units could be similarly managed, unless otherwise specified.

Another example of computer software to provide system-managed storage is IBM Data Facility Storage Management Subsystem for Virtual Machines software (hereinafter referred to simply as DFSMS/VM), which is a subcomponent of the IBM Virtual Machine (VM) series of operating systems. The currently available release 1 of DFSMS/VM does not provide space or availability management, but does provide several improvements to the VM operating systems. Traditionally, VM operating systems have used a minidisk file system (MFS) for organizing data for users on peripheral storage devices. MFS preallocates contiguous storage space (a consecutively addressed logical portion of a physical storage space) within the data storage hierarchy to individual users. Each preallocated contiguous storage space is known as a "minidisk" because it appears to be a complete peripheral storage device (such as a DASD) to the user. A minidisk is a set of consecutively addressed DASD cylinders. Each minidisk is owned by (i.e. assigned to) a particular user, no other users can store or access files thereon unless so authorized by the owning user. A minidisk (and MFS) is said to be "preallocated" because the storage space reserved to a user is typically larger than that immediately needed by that user. As a user fills a minidisk with files, there is a tendency to try to keep at least a portion of that minidisk available for new files by manually deleting the existing, unused files. The condition of "underutilization" refers to the remaining increments of unused storage space spread throughout the data storage hierarchy and results in a significant amount of wasted storage space. In addition, "fragmentation" results when a minidisk is deallocated from a particular user and cannot be reallocated to another user because it is too small to meet the needs of such other user.

A relatively new file system, known as the "shared" file system (SFS), is included in current releases of VM operating systems, such as Virtual Machine/System Product (VM/SP) release 6. Shared file systems significantly reduce underutilization and fragmentation problems as compared to MFS. However, because of the large number of existing VM operating systems users, the use of MFS has not been discontinued. Thus, SFS and MFS may exist simultaneously in a data storage hierarchy. SFS allows for the dynamic sharing of peripheral storage space among different users. Physical storage space is not preallocated to a user account. Instead, as each user actually stores a file, storage space is dynamically allocated for that file only. Users are given accounts to a file pool, which is simply a collection of files for a set of users. In VM operating systems, a file pool is a collection of minidisks owned by a single virtual machine that contain files for a number of users. Each user stores files in a logical file space within a SFS storage group, which is a collection of minidisks within a file pool. The storage space assigned to a file space changes dynamically as files are added thereto, deleted therefrom, or updated. The files in each file space can be organized into one or more directories (and subdirectories within each directory), the file space itself being a top level of the directory hierarchy.

SFS includes control information in level 0 storage as part of every file pool. The control information includes files of information used to locate minidisks in the respective file pool and to track which blocks of such storage space are in use. The control information also includes a catalog of information about the directories and files in the file pool, such as the owner of each file. Multiple file pools can exist for each instance of DFSMS/VM, each file pool being an instance of SFS.

Two heretofore unrecognized problems exist which are undesirable in the system-managed storage environment of DFSMS/VM. First, each instance of DFSMS and existing releases of DFSMS/VM (and all other known storage management software) require their own segregated level 1 storage. Currently, SFS files are given a unique, internal identifier to distinguish between files within the SFS catalog. Because there is no simple, unique way to identify files across (among separate instances of) file systems, file pools, operating systems, etc. in a network, separate (physically segregated) storage spaces of files must be maintained in each data storage hierarchy level for each such subdivision of a network to ensure that the files therein can be properly distinguished. The overhead and associated loss of efficiency related to maintaining segregated storage space is undesirable. Second, the use of common DASD control files to map the files in the separate level 1 storage spaces to their level 0 source files is undesirable as such is complex, inefficient and error prone.

SUMMARY OF THE INVENTION

In view of the foregoing, it is the principal object of the invention to improve storage management of file systems in a data storage hierarchy.

Another object of the invention is the sharing of one or more storage levels across a network in a data storage hierarchy.

Yet another object of the invention is the elimination of separate, complex, and inefficient control files.

These and other objects are inherently accomplished by a directory naming scheme which permits a file to be uniquely identified across an entire network. The SFS internal identifier is only part of a directory naming convention which includes names for each subdivision (TSAF collection, VM operating system, file pool, etc.) in a network. Because each file can be uniquely identified across the network, a single level 1 storage space of a file space, or a directory therein, can be used for the entire network. Also, because the unique identification of a level 1 storage file and/or directory is inherently included in its name, the common DASD control files previously used to map level 1 storage to level 0 storage is eliminated.

The foregoing and other objects, features, and advantages of the invention will be apparent from the following more particular description of the preferred embodiment of the invention, as illustrated in the accompanying drawing.

DETAILED DESCRIPTION OF THE PREFERRED EMBODIMENT

Figure 1:
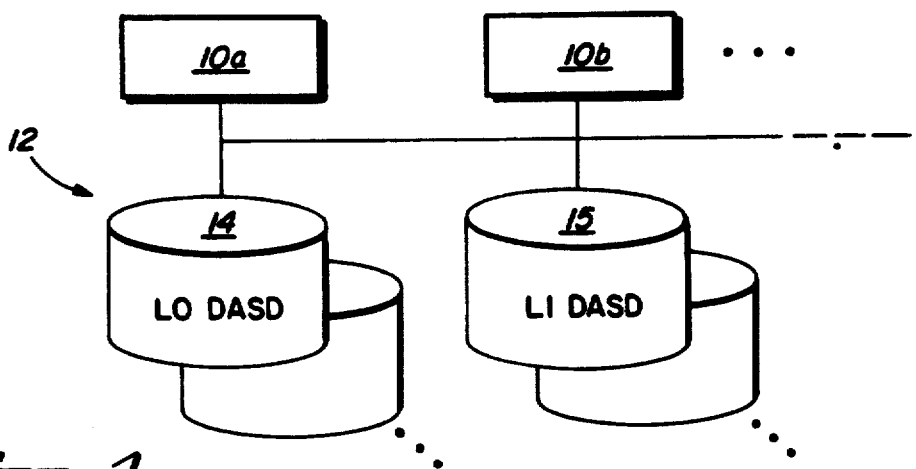
FIG. 1 is a schematic block diagram of a data storage hierarchy according to the invention.

Referring now more particularly to the drawing, like numerals denote like features and structural elements in the various figures. The invention will be described as practiced in a network of multi-host processor data processing environments each having a plurality of peripheral data storage devices. It should be understood that the invention may also be practiced in a variety of data processing system structures, such as those having a smaller number of peripheral data storage devices, different types of peripheral data storage devices, or single host processor environments.

Referring to FIG. 1, a data storage hierarchy 12 in a multi-host processor environment will now be described. The system includes two or more host processors, such as a host processor 10a and a host processor 10b, each including the usual component portions of a host processor, such as the arithmetic logic unit, control unit, etc. Each host processor can be a uniprocessor or multiprocessor. An example of a host processor which may be used in the data processing system shown is the IBM 3090 mainframe computer. Each host processor may employ one or more operating systems to supervise the operations thereof. In the preferred embodiment, the host processors are uniprocessors using an IBM VM operating system.

Host processors 10a and 10b are coupled to relatively high and relatively low performance DASD for storing relatively active and relatively inactive data, respectively. High performance DASD 14 are part of level 0 ("L0") of data storage hierarchy 12. Level 0 is the highest level of the hierarchy. Low performance DASD 15 are part of level 1 ("L1") of data storage hierarchy 12. Level 1 is the next highest level (or at least, some relatively lower level) of the hierarchy. An example of a DASD which may be used in data storage hierarchy 12 is the IBM 3380 or IBM 3390 DASD. High performance DASD 14 could be IBM 3390 DASD and low performance DASD 15 could be IBM 3380 DASD, or high performance DASD 14 could be cached and low performance DASD 15 could be without cache, etc. Each DASD stores a volume of data. Hierarchy 12 could also include additional storage levels, or different types of peripheral storage devices, such as tape drives. Note that level 0 storage and level 1 storage could simply be logical partitions of the same performance peripheral storage device. Thus, in some embodiments, it is possible to have a single peripheral storage device shared among both level 0 and level 1 storage.

The remaining components of the data processing system, such as the system console(s), are not shown in the drawing. The dotted and dashed lines represent possible additional system components. Additional host processors and peripheral storage devices, including other types of peripheral storage devices, could be added as required. The ability to add system components is limited only by the connectivity of the components. The remaining and additional data processing system components, and details of the connections between the components, are not shown in the drawing, but are well known.

Figure 2:
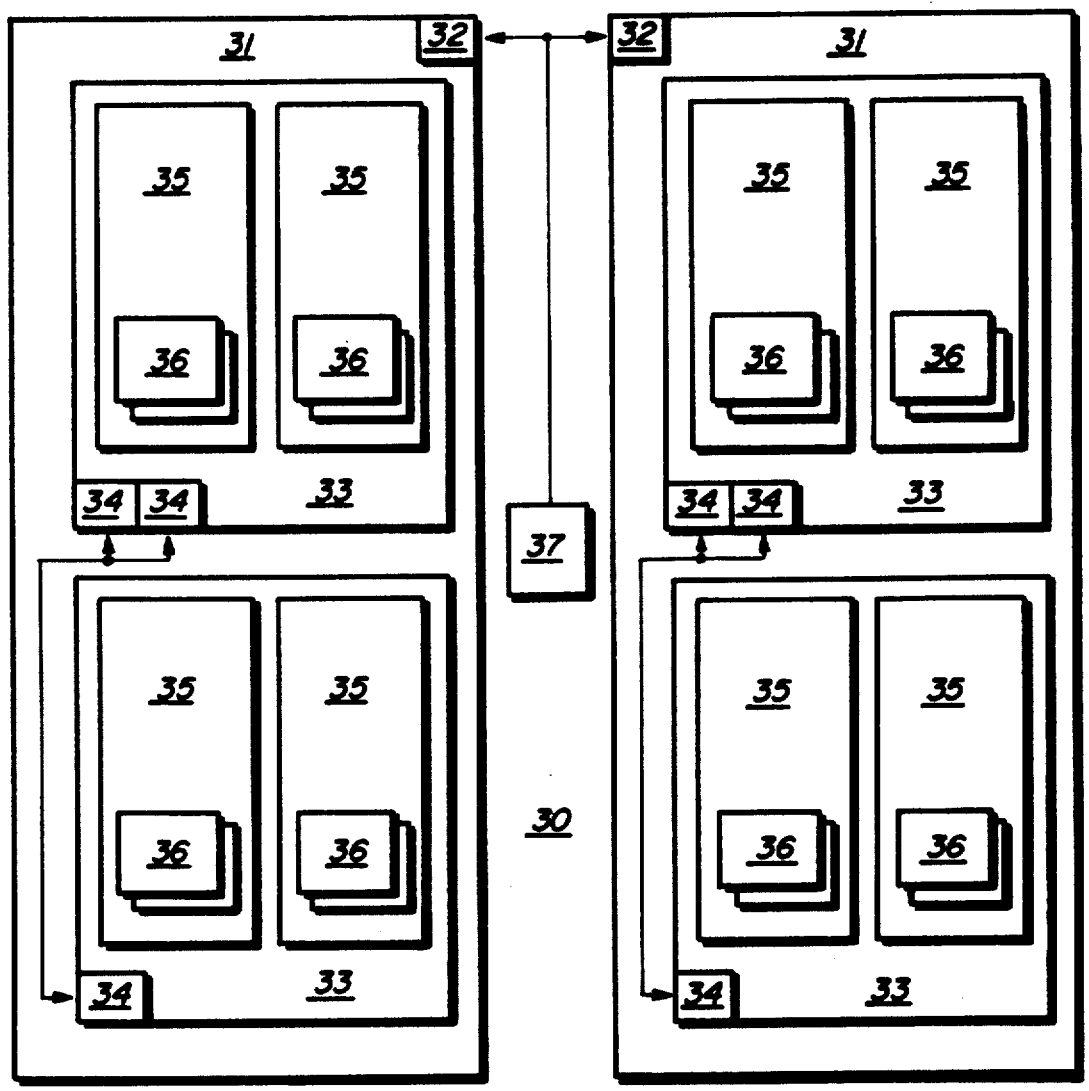
FIG. 2 is a schematic block diagram of a series of operating system environments according to the invention arranged in a network.

Referring to FIG. 2, a series of VM operating systems, each running DFSMS/VM, is shown arranged in a network 30. A network is a set of two or more computer systems linked in such a way as to let data to be transmitted between them. Here, network 30 is designed according to the IBM Systems Network Architecture (SNA). Network 30 is divided into a series of subnetworks 31 (two are shown) coupled by gateways 32. Each subnetwork 31 includes one or more transparent services access facility (TSAF) collections 33 (four are shown) each coupled by one or more gateways 34. TSAF is a component of a VM operating system that handles communications with other operating systems by proper routing of the communications. A TSAF collection is a group of up to eight interconnected VM operating systems. A gateway is a uniquely named logical unit for a subnetwork 31 or TSAF collection 33 used for communications therebetween. Gateways 32 and 34 are communication servers including a logical processor which provides the protocol for communications between subnetworks 31 and TSAF collections 33. Here, the IBM Advanced Program-to-Program Communications for VM (APPC/VM) protocol is used. Further description of the network structure can be found in IBM Manual SC24-5378-00, VIRTUAL MACHINE/SYSTEM PRODUCT CONNECTIVITY PLANNING, ADMINISTRATION AND OPERATION RELEASE 6 and IBM Manual SC24-5377-00, VIRTUAL MACHINE/SYSTEM PRODUCT CONNECTIVITY PROGRAMMING GUIDE AND REFERENCE RELEASE 6 which are available from IBM Corporation and which are hereby incorporated by reference.

Each VM operating system 35 of TSAF collection 33 (two are shown for each TSAF collection 33) includes DFSMS/VM. The VM operating system including the DFSMS/VM application is provided to a host processor on a data storage medium and uploaded to main memory as required. Within each VM operating system 35 is one or more SFS file pools 36 (and SFS storage groups within a file pool) and/or one or more MFS minidisks (not shown). A file pool (or storage group) 37 is part of one of the VM operating systems and includes a file space owned by DFSMS/VM (i.e. assigned to the user id that is DFSMS/VM). Users of network 30 could also be assigned file spaces in file pool 37. The use of the file space owned by DFSMS/VM is shared among all VM operating systems 35 in network 30. Additional file spaces owned by DFSMS/VM may be created, such as one file space for each type of storage management, or a single integrated file space may be used.

Also, if a single file space owned by DFSMS/VM is used, a directory could be created within the file space for each type of storage management, or a single integrated directory may be used.

Figure 3:
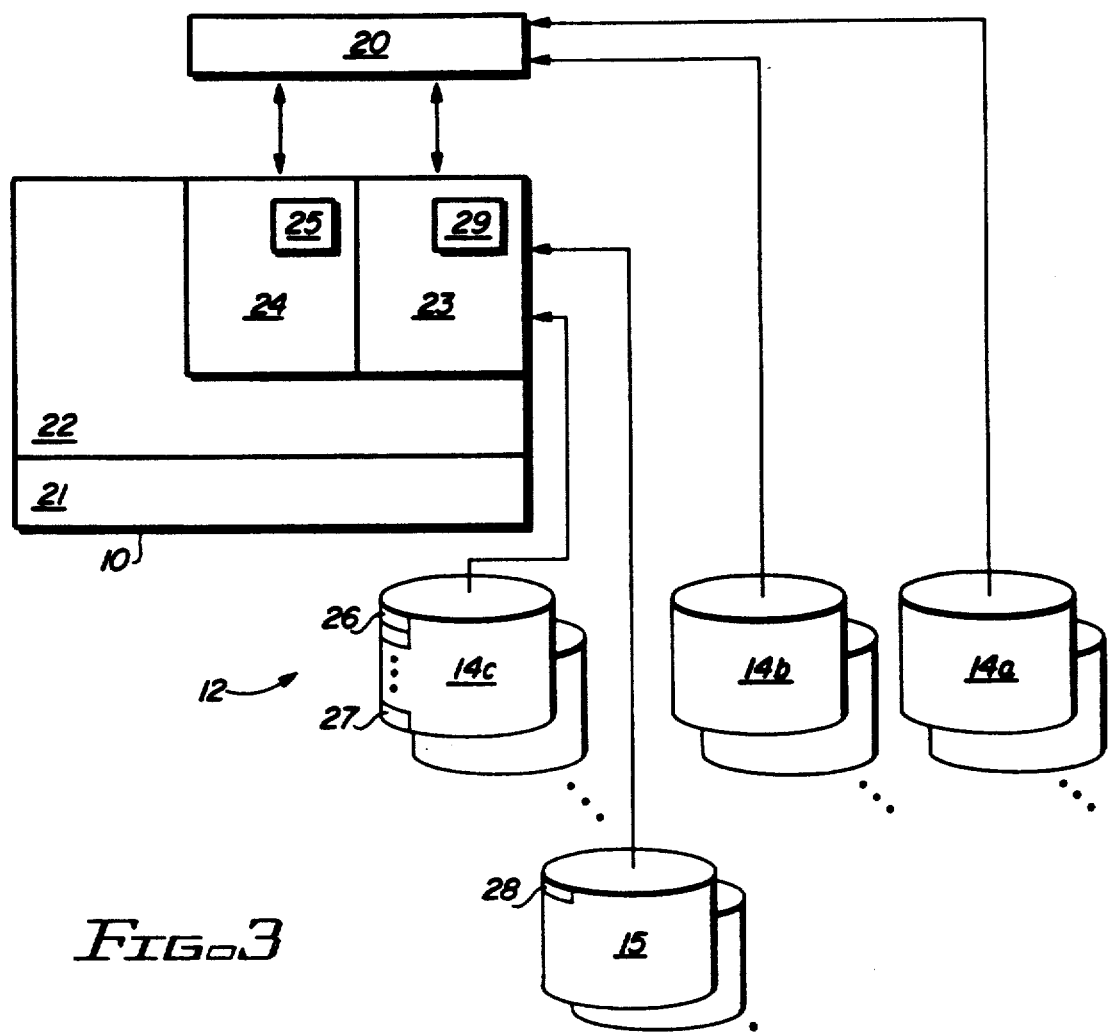
FIG. 3 is a schematic block diagram of an operating system environment in the data storage hierarchy and network of FIGS. 1 and 2 according to the invention.

Referring to FIG. 3, an individual IBM VM operating system environment employing DFSMS/VM according to the invention will now be described. One or more user terminals 20 interact with a host processor running the operating system through input/output terminals. The terminals are coupled to one or more host processors 10 running the IBM VM operating system which is in turn coupled to peripheral storage devices to create a data storage hierarchy 12. The VM operating system includes two basic components shown in the drawing, the control program (CP) 21 and the conversational monitor system (CMS) 22.

CP 21 manages the processor environment to make it appear to each user that he is in an independent and fully functional processor environment. These virtual machines appear to operate independently and simultaneously. CP 21 also monitors and manages system resources, controls the recovery from hardware problems, and accounts for system usage. Usually, a user requires some other operating system to actually do useful work, such as CMS 22.

The VM operating system supports its own interactive component, CMS 22, which is actually an operating system that runs only on a virtual machine. CMS 22 provides for two-way conversation between users and the system—allowing users to develop and execute application programs, communicate with other users, and create and edit files. CMS 22 includes two known file systems to create and edit files, MFS and SFS 23 (including file servers therefor), as previously described. MFS is represented by the coupling of users 20 to level 0 DASD 14a and 14b. DASD 14a is a CMS minidisk and DASD 14b is a non-CMS minidisk used for level 0 storage. SFS 23 is coupled to level 0 DASD 14c and level 1 DASD 15 and includes SFS catalog 29. A single instance of SFS is shown in the drawing (i.e. one file pool), but a plurality of such could be included. CMS 22 also supports other programs for various applications. Further description of these components of the VM operating system may be found in IBM Manual SC24-5284-01, VIRTUAL MACHINE/SYSTEM PRODUCT APPLICATION DEVELOPMENT REFERENCE FOR CMS RELEASE 6; IBM Manual SC24-5367-00, VIRTUAL MACHINE/SYSTEM PRODUCT CMS SHARED FILE SYSTEM ADMINISTRATION RELEASE 6; IBM Manual SC24-5369-00, VIRTUAL MACHINE/SYSTEM PRODUCT USING RELEASE 6 ENHANCEMENTS RELEASE 6; all of which are available from IBM Corporation and are hereby incorporated by reference.

Another component of the VM/SP operating system shown in the drawing is DFSMS/VM 24, as is known, but modified to be a centralized and system-managed storage management facility. According to the invention, DFSMS/VM may include both space and availability management. In different embodiments, both availability and space management are provided for MFS files and SFS files, availability management is provided for both MFS files and SFS files and space management is provided only for SFS files or vice-versa, or either availability management or space management only is provided for both MFS and SFS files. In the embodiment described here, availability management is provided for both MFS files and SFS files and space management is provided only for SFS files.

ACS routine 25 is used in DFSMS/VM 24 as it is in DFSMS. APPC/VM protocol is used for communications between SFS 23 and DFSMS/VM 24, and for communications between users 20 and SFS 23 or DFSMS/VM 24. The remaining interfaces, basic operating principles, and directories and catalogs of DFSMS/VM, except as described herein, are similar to those of existing releases of DFSMS or DFSMS/VM. Further information on how DFSMS/VM is implemented can be found in supporting documentation such as IBM Manual GC-26-4604-01, DFSMS/VM GENERAL INFORMATION RELEASE 1; IBM Manual SC26-4605-00, DFSMS/VM USER'S GUIDE; IBM Manual LY27-9583-00, DFSMS/VM DIAGNOSIS RELEASE 1 or in the supporting documentation of its predecessors in storage management such as IBM Document G321-5349-00, SYSTEM MANAGED STORAGE, reprinted from IBM Systems Journal Vol. 28, No. 1, pp.77-103, 1989; IBM Manual GG24-3403-00, DFSMS IMPLEMENTATION PRIMER SERIES: WRITING ACS ROUTINES; IBM Manual SC26-4514-01, MVS/ESA STORAGE ADMINISTRATION REFERENCE VERSION 3 RELEASE 1; IBM Manual GC26-4507-01, MVS/ESA DATA FACILITY PRODUCT GENERAL INFORMATION VERSION 3; IBM Manual SH35-0083-04, DATA FACILITY HIERARCHICAL STORAGE MANAGER SYSTEM PROGRAMMER COMMANDS REFERENCE VERSION 2 RELEASE 5. All of the aforementioned documents are available from IBM Corporation and are hereby incorporated by reference. Further information is available in U.S. Pat. Nos. 4,638,424, 4,771,375, and 4,876,662, which are also hereby incorporated by reference. User terminals 20, SFS 23 and DFSMS/VM 24 are implemented as virtual machines under CP 21. CMS 22 is actually incorporated into these virtual machines, but is shown separately to demonstrate its function.

Storage management of the files in data storage hierarchy 12 requires the storage of management criteria and management attributes. The management criteria are defined as management classes in a configuration file as part of the control information. SFS catalog 29 stores the management classes selected by ACS routine 25 for each SFS file. SFS catalog 29 also stores the management attributes for each SFS file. Storage management of the SFS files includes the usual comparison of the management criteria represented by the management classes to the management attributes, and any actions required thereby. Each level 0 storage space 26 of a SFS file space may include one or more directories and subdirectories. These logical groupings of files may similarly be assigned a management class and managed by DFSMS/VM 24. Further description of these data structures can be found in the aforementioned documents incorporated by reference.

To accommodate the storage of both the management class and management attributes for MFS files and minidisks, a single repository SFS file space having level 0 storage space 27 on DASD 14c is created. The repository file space can be located in file pool 37 and is owned by DFSMS/VM 24. For each MFS file identified to DFSMS/VM 24, an empty file is created in the repository file space. For each such MFS minidisk, a directory is created in the level 0 portion 27 of the repository file space. The creation of each empty file or directory in the level 0 portion 27 of repository file space causes ACS routine 25 to automatically select a management class for such file or directory and store an indication of such in SFS catalog 29 as would be done for any SFS file or directory. The SFS files associated with the MFS files are left empty as no other information need be stored for storage management. DFSMS/VM 24 compares the management attributes stored in the MFS catalog (not shown for convenience) and the management criteria represented by the management class in the SFS catalog 29, and manages the MFS files and minidisks accordingly. Thus, storage management is accomplished for both file systems using the SFS file system to "assist" the storage management of the MFS file system.

A naming convention is used to map a MFS file or minidisk to its associated SFS file or directory in the level 0 portion 27 of the repository file space. The directories are named as follows:

filepoolid:DFSMSxxx.MINIDISKMAP.fqluname.smsglobresid.mdowner.vaddr where:

"filepoolid" is the file pool name.

"DFSMSxxx" is the file space name. This name form signals DFSMS/VM 24 that the repository file space is to be managed by DFSMS/VM, but that files therein are not themselves to be migrated.

"MINIDISKMAP" is a constant name which clearly distinguishes a repository file space for availability management from a repository file space for other storage management functions (such as space management). Note that a single repository file space could be used for all storage levels.

"fqluname" is the combined (concatenated) name of subnetwork 31 and gateway 34. This uniquely identifies the TSAF collection 33 that the minidisks being managed reside in and is obtained from parameters specified by the storage administrator of DFSMS/VM 24.

"smsglobresid" is the TSAF collection-wide APPC/VM resource name for the VM operating system 35 and DFSMS/VM 24 which is managing the minidisks, uniquely identifying such within a TSAF collection 33. This also is obtained from the control file of DFSMS/VM 24.

"mdowner" is the user name of the owner of the minidisk being managed.

"vaddr" is the virtual address of the minidisk being managed.

To access a file, the file name and file type are also required. The files within the directories of the repository file space have the same file names and file types as the MFS files they represent. The repository file space can be placed in its own SFS storage group to minimize its effect on the performance of other SFS users.

The same naming scheme is used in conjunction with a SFS internal identifier to allow level 1 storage to be shared across network 30 for space management. File pool 37 includes a file space, which may be the repository file space, having some common level 1 storage space 28 therein. Storage space 28 is thus used to store all of the migrated SFS files for network 30, regardless of their owner and source location. The naming scheme is used to inherently and uniquely identify a migrated SFS file or directory, regardless of the file pool 36, operating system 35, TSAF collection 33, and subnetwork 31 from which the SFS file was migrated. The directories are named as follows:

filepoolid:DFSMSxxx.MIGRATIONLEVEL1.fqluname.smsglobresid.filepool.storagegroup where:

"filepoolid", "DFSMSxxx", "fqluname", and "smsglobresid" are as previously described.

"filepool" is the file pool from which the SFS file was migrated.

"storagegroup" is the storage group from which the SFS file was migrated.

To locate a migrated SFS file, the file name and file type are also required. The files within storage space 28 have a file name and a file type which is created from a SFS internal identifier for the associated level 0 source file. SFS 23 uses the internal identifier in existing releases of VM operating systems to uniquely identify a file within a file pool 36. This is required because multiple users have access to the same file pool and may thus each place a file therein having the same file name and file type. The SFS internal identifier allows SFS 23 to differentiate between such otherwise commonly named files. In the preferred embodiment, the naming scheme uses an eight EBCDIC character file name and an eight EBCDIC character file type. The SFS internal identifier is translated from 8 characters of binary data (as used within SFS 23) into 16 EBCDIC characters representing hex code, one hex code character per each half byte of binary data, for use in the directory of storage space 28.

In the described manner, each SFS source file or directory in network 30 is uniquely identifiable in the storage space 28 or a directory thereof. Storage space 28 can thus be used to store all of the level 1 SFS migration files for the entire network 30, thereby reducing the overhead that is associated with maintaining file spaces and/or storage devices for level 1 storage of each file pool 36, VM operating system environment 35, TSAF collection 33, etc. If in an alternative embodiment space management is similarly provided for MFS files, the naming convention would use "mdowner" and "vaddr" instead of "filepool" and "storagegroup" to uniquely identify the level 1 MFS files.

By inherently guaranteeing the uniqueness of a SFS file name across network 30 in the naming scheme itself, the need for control files similar to those used in DFSMS for mapping migrated files to their primary copy is eliminated. If the naming scheme is similarly used for common level 1 storage for other types of storage management in addition to space management, a single file space can be used for level 1 storage for each type of storage management, or a separate file space may be used for level 1 storage for each space management function. If the naming scheme is similarly used for common level 1 storage in availability management, the control files for mapping may not be entirely eliminated because some mapping is still required to link the primary copy of a file to the secondary copies of a file.

METHOD OF OPERATION

Figure 4:
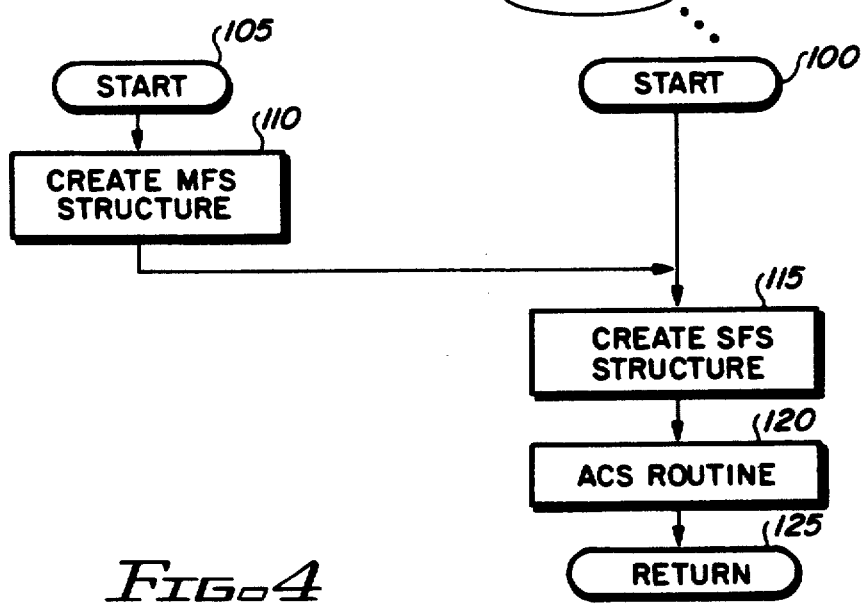
FIG. 4 is a flow diagram of the operations for defining a file to the storage management subsystem according to the invention.

Referring to FIG. 4, the method of defining a data entity to DFSMS/VM according to the invention will now be described. Operations begin at step 100 or step 105 upon the call of the host processor, depending upon whether the data entity is a SFS file or directory, or a MFS file or minidisk respectively. For a SFS file or directory to be managed by DFSMS/VM, such file or directory is created at step 115. At step 120, the ACS routine assigns the management class to the file or directory, which is stored in the SFS catalog. The flow then returns at step 125. For a MFS file or minidisk, such file or minidisk is created at step 110. Then, at step 115, an empty SFS file is created in the repository file space corresponding to the MFS file (and/or a SFS directory corresponding to the MFS minidisk). The ACS routine again assigns a management class at step 120 and the flow again returns at step 125.

Figure 5:
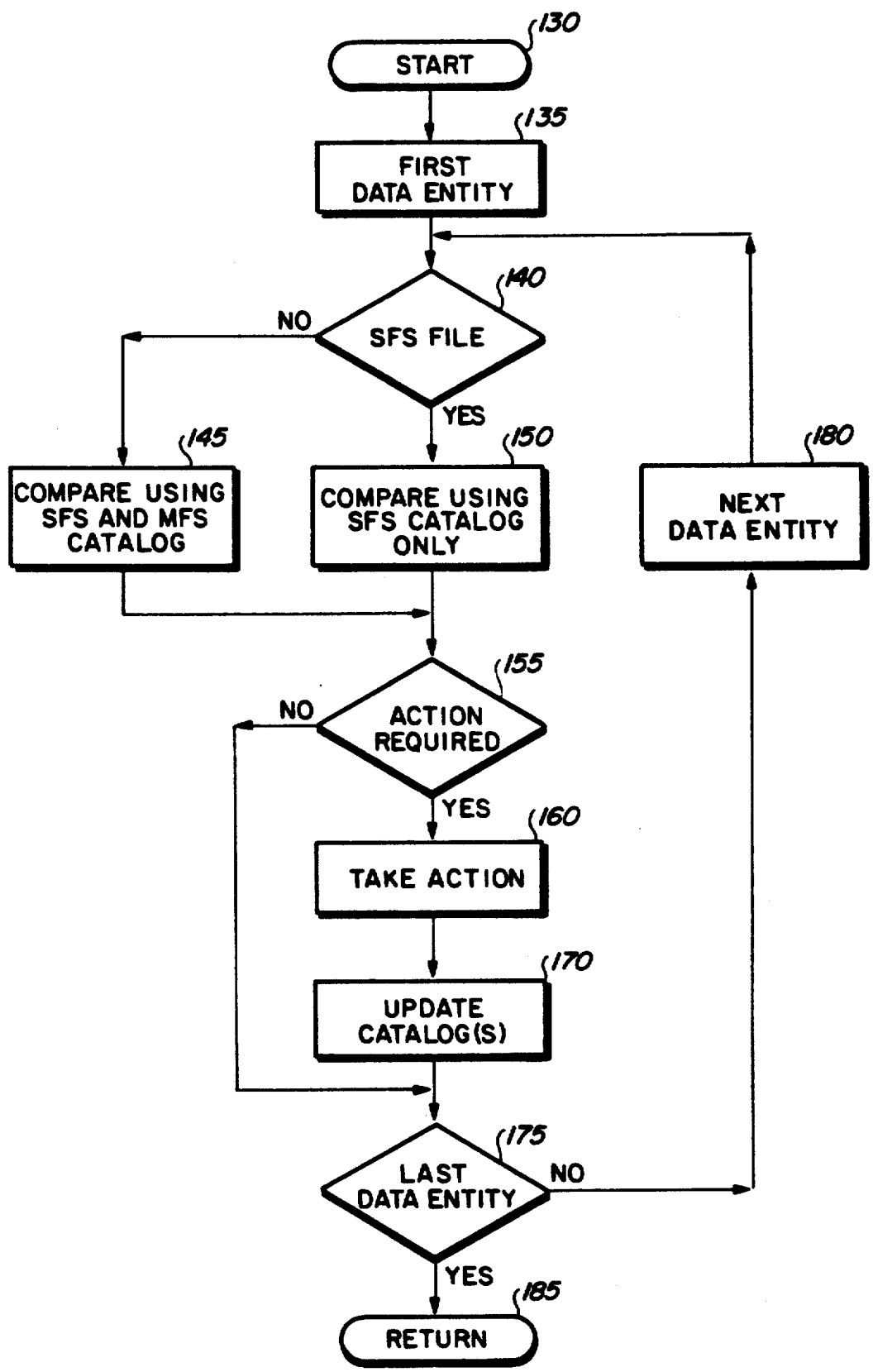
FIG. 5 is a flow diagram of the storage management operations according to the invention.

Referring to FIG. 5, the storage management operations of DFSMS/VM according to the invention will now be described. DFSMS/VM is called by the host processor to manage the storage at step 130. At step 135, DFSMS/VM examines the first data entity to be managed, as listed in the SFS catalog and/or MFS catalog. Step 140 branches according to whether the first such item in the list is a SFS file (or directory), or a MFS file (or minidisk). If the first data entity is a MFS file or minidisk, DFSMS/VM compares the management criteria represented by the management class in the SFS catalog to the management attributes of the data in the MFS catalog at step 145. If the first data entity is a SFS file or directory, DFSMS/VM compares the management criteria represented by the management class in the SFS catalog to the management attributes of the data in the SFS catalog at step 150. If no management action is required, step 155 branches to step 175. If any action is required, such as a data migration, backup, or deletion, such action is taken at step 160. Such action includes the use of the naming scheme to inherently and uniquely identify a level 1 file across the network. The relevant subcomponents of the aforementioned naming scheme are acquired and concatenated for use as required. Data transfers may be accompanied by data compaction. Step 160 may also include updating the relevant directory entries to reflect any change in the status of the data, such as an indication that a file has been migrated or that a secondary copy of the file exists. At step 170, the management attributes in the SFS catalog (and, possibly, also the MFS catalog) are updated to reflect the action taken. Step 175 then branches according to whether there is another data entity that has not yet been examined for storage management. If there is another data entity, the flow branches to step 180 to examine the next data entity and then returns to step 140. If there are no more files to examine, DFSMS/VM returns control to the host processor at step 185.

Pseudocode listings according to the invention are provided below. The first listing is for defining MFS files and minidisks to DFSMS/VM and for the selection of management classes therefor.

```
/* System managed storage of minidisks using SFS as a    */
/* repository to store management classes.               */
/* This routine handles only the availability management */
/* of MFS files function.                                */
input:
```

-continued

```
minidisk_backup_repository_filepoolid    char(8),
minidisk_backup_repository_filespace     char(8),
fully_qualified_luname                   char(16),
DFSMS_global_resource_id                 char(8),
#_of_minidisks                           fixed(31),
minidisk_list                            array(#_of_minidisks)
owner                                    char(8),
virtual_address                          char(4);
declare:
minidisk_backup_repository_name constant('MINIDISKMAP');
do i = 1 to #_of_minidisks;  /* for each minidisk inputted  */
/* build minidisk backup repository directory name by       */
/* concatenating input values                               */
mbr_dirname =  minidisk_backup_repository_filepoolid  ||':'||
               minidisk_backup_repository_filespace   ||':'||
               minidisk_backup_repository_name        ||':'||
               fully_qualified_luname                 ||':'||
               DFSMS_global_resource_id               ||':'||
               minidisk_list(i).owner                 ||':'||
               minidisk_list(i).virtual_address;
if (mbr_dirname directory does not exist) then
create directory mbr_dirname using SFS DMSCRDIR CSL
call;
create list_if_files_to_be_managed from the CMS minidisk
directory;
create list of files in mbr_dirname using SFS DMSOPDIR and
DMSGETDI CSL calls;
do j = 1 to #_of_files_on_minidisk;  /* for each file on */
                                     /* minidisk         */
if (list_of_files_to_be_managed(j) has no corresponding
file of the same filename and filetype in mbr_dirname)
then
create an empty file of this filename and filetype in
mbr_dirname using SFS DMSOPEN CSL call;
if (this is an unconditional backup) then
call backup_file(list_of_files_to_be_managed(j));
else do; /* incremental backup                            */
call SMS_processing_decision passing the management
class of the file in mbr_dirname and the file's
management attributes;
if decision is BACKUP_FILE_DECISION then
call backup_file(list_of_files_to_be_managed(j));
end; /* incremental backup do                             */
end; /* do for #_of_files_on_minidisk                     */
end; /* do for #_of_minidisks                             */
```

The second listing is for space management of SPS files and directories. "MC" means management class; "ML1" means level 1 storage for migrated data. "Null" means that a set of blanks have been purposefully assigned as the management class for a file or directory. The listing first shows obtaining a null, non-existent, or otherwise (regularly) assigned management class for a file, with a default to obtaining a null, non-existent, or otherwise (regularly) assigned management class for a directory if the management class for a file is null. The listing then shows data expiration and migration decisions/actions based on the management class and management attributes.

```
/* Obtain MC definition and make initial decision based    */
/* on MC Name                                              */
select on the File_Management_Class input parameter:
when (null) then
select on the Directory_Management_Class input
parameter:
when (null) then
get the system default's management
class/criteria
if that management class does not exist in the
current configuration then
Output a no management class error message
goto EXIT_POINT
else if other error occurred,
Output an internal error message
goto EXIT_POINT
when (no management class indicator) then
if the command issued input parm is MIGRATE then
if File_Record_Size input parm > 0 then
Decision = MIGRATE
Migrate_Age = 0
endif
else (command is MANAGE)
Decision = NO_ACTION
endif
otherwise
get the directory's management class/criteria
if that management class does not exist in the
current configuration then
Output a no management class error message
goto EXIT_POINT
else if other error occurred,
Output an internal error message
goto EXIT_POINT
endselect
when (no management class indicator) then
if the command issued input parm is MIGRATE then
if File_Record_Size input parm > 0 then
Decision = MIGRATE
Migrate_Age = 0
endif
else (command is MANAGE)
Decision = NO_ACTION
endif
otherwise
get the file's management criteria
if that management class does not exist in the
current configuration then
Output a no management class error message
goto EXIT_POINT
else if other error occurred,
Output an internal error message
goto EXIT_POINT
endselect
if Decision = MIGRATE or NO_ACTION then
goto EXIT_POINT
/* Make expiration decision based on MC Definition       */
if the Command_Issued input parm is MANAGE and
the Date_of_Creation input parm > 0 and
the Date_of_Last_Reference input parm > 0 then
do
if both expire-after-days-nonusage MC criteria
and
expire-after-date/days MC parameter are NOLIMIT
then
do
file is not to be expired
end
else if expire-after-days-nonusage = NOLIMIT
or expire-after-days-nonusage < = (current-date
minus Date_of_Last_Reference input parm)
then
/* the two previous conditions mean that the            */
/* expire-after-days-nonusage is either inappli-        */
/* cable (NOLIMIT) or fulfilled. In either              */
/* case, the expire-after-days-attribute must           */
/* now be fulfilled to expire the file.                 */
do
if expire-after-date/days specifies an
absolute date that is < = current date
or expire-after-date/days specifies a
number that is < = (current-date minus
Date_of_Creation input parm)
or expire-after-date/days = NOLIMIT
then
file is to be expired
else
file is not to be expired
endif
end
else
do
file is not to be expired
end
endif
if file is to be expired then
if the Expiration Disposition MC criteria =
ENTIRE then
Decision = EXPIRE_FILE_ENTIRE
```

```
else
Decision = EXPIRE_FILE_DATA_ONLY
endif
endif
end
endif
if Decision = EXPIRE_FILE_ENTIRE or
EXPIRE_FILE_DATA_ONLY
goto EXIT_POINT
/* Make migration decision based on the MC Definition   */
/* for those files not eligible for expiration          */
select on Command-or-Auto-Migrate MC criteria
when (NONE)
do
Decision = NO_ACTION
end
when (BOTH)
do
if the Command_Issued input parm is MIGRATE then
do
if File_Record_Length > 0 then
Decision = MIGRATE
Migrate_Age = 0
endif
end
else (command is MANAGE)
do
if Date_of_Last_Reference input parm > 0
and Primary-Days-Non-Usage MC criteria <=
days since Date_of_Last_Reference
input parm
and Storage_Level input parm = PRIMARY
then
do
if File_Record_Length > 0 then
Decision = MIGRATE
Migrate_Age = Current-Date minus
minus Date_of_Last_Reference
endif
end
else
do
Decision = NO_ACTION
end
end
end
when (COMMAND)
do
if the Command_Issued input parm is MIGRATE then
do
if File_Record_Length > 0 then
Decision = MIGRATE
Migrate_Age = 0
endif
end
else
Decision = NO_ACTION
end
otherwise
do
Output invalid MC parameter Error message
end
The third listing is for the generation of file and
directory names in creating and accessing data migrated
to level 1 storage.
Translate 8 byte hex internal identifier (ID) to 16
byte EBCDIC character filename and filetype. Each
half byte of the ID (hex) represents a hex value
between '0'x and 'F'x. These numeric values are
translated into their full byte EBCDIC characters
'0' through 'F'. The resulting 16 EBCDIC characters
will be the filename and filetype of the owned
storage file.
Obtain filepool id and ML1 owned storage from
DFSMS/VM control file
Obtain fully qualified lu name from DFSMS/VM control
file
Obtain resource id from DFSMS/VM control file
Obtain the storage group from the first two bytes of
the ID
Obtain the filepool from the input parameter
Construct the directory of the file in owned storage
with the above information in the following format
Filepoolid:DFSMSxxx.MIGRATIONLEVEL1.fqluname.
SMSglobresid.filepool.storagegroup
```

While the invention has been shown and described with reference to a preferred embodiment thereof, it will be understood by those skilled in the art that various changes in form and detail may be made therein without departing from the spirit, scope and teaching of the invention. For example, in FIG. 2, the number of networks, TSAF collections, VM systems, file pools . . . could be varied. Accordingly, the invention disclosed herein is to be limited only as specified in the following claims.

What is claimed is:

1. A method for the storage management of a data storage hierarchy, the data storage hierarchy including a user interface, at least one level 0 peripheral storage device, a level 1 peripheral storage device, and a host processor coupled to the user interface and level 0 and level 1 peripheral storage devices, user interface permitting user specification of a first file having a first file name and of a second file having a second file name, said at least one level 0 peripheral storage device including storage space for a first file pool and a second file pool each under the control of one of a plurality of operating systems, each operating system assigned a different operating system identifier, the first file pool assigned a first file pool identifier unique to the one of a plurality of operating systems which controls the first file pool, the second file pool assigned a second file pool identifier unique to the one of a plurality of operating systems which controls the second file pool, the first file pool including the first file, the first file assigned a first file identifier unique to the first file pool and different than the first file name, the second file pool including the second file, the second file assigned a second file identifier unique to the second file pool and different then the second file name, the first file identifier identical to the second file identifier, the level 1 peripheral storage device including storage space for a shared file space thereon, the level 1 peripheral storage device having greater storage capacity and lower performance relative to said at least one level 0 peripheral storage device, the host processor coupled to the user interface and the level 0 and level 1 peripheral storage devices, the host processor having access to a first catalog storing management attributes for the first file, the first file identified in the first catalog by the first file identifier, the host processor also having access to a second catalog storing management attributes for the second file, the second file identified in the second catalog by the second file identifier, the method comprising the machine-executed steps of:

assigning storage management criteria to the first file and the second file and storing such in the first catalog and the second catalog respectively;

comparing the management criteria of the first and second files with the management attributes of the first and second files respectively;

if the step of comparing so determines, transferring the first file to the file space and assigning the first file a first unique name within the file space, the first unique name including the first file identifier, the first file pool identifier, and the operating system identifier for the one of a plurality of operating systems which controls the first file pool, or transferring the second file to the file space and assigning the second file a second unique name within the file space, the second unique name different than the first unique name and including the second file identifier, the second file pool identifier, and the operating system identifier for the one of a plurality of operating systems which controls the second file pool; and updating the management attributes of the first and second files accordingly.

2. A data processing system for storage management in a data storage hierarchy including a user interface, at least one level 0 peripheral storage device, a level 1 peripheral storage device, and a host processor coupled to the user interface and level 0 and level 1 peripheral storage devices, the user interface permitting user specification of a first file having a first file name and of a second file having a second file name, said at least one level 0 peripheral storage device including storage space for a first file pool and a second file pool each under the control of one of a plurality of operating systems, each operating system assigned a different operating system identifier, the first file pool assigned a first file pool identifier unique to the one of a plurality of operating systems which controls the first file pool, the second file pool assigned a second file pool identifier unique to the one of a plurality of operating systems which controls the second file pool, the first file pool including the first file, the first file assigned a first file identifier unique to the first file pool and different than the first file name, the second file pool including the second file, the second file assigned a second file identifier unique to the second file pool and different than the second file name, the first file identifier identical to the second file identifier, the level 1 peripheral storage device including storage space for a shared file space thereon, the level 1 peripheral storage device having greater storage capacity and lower performance relative to said at least one level 0 peripheral storage device, the host processor coupled to the user interface and the level 0 and level 1 peripheral storage devices, the host processor having access to a first catalog storing management criteria and management attributes for the first file, the first file identified in the first catalog by the first file identifier, the host processor also having access to a second catalog storing management criteria and management attributes for the second file, the second file identified in the second catalog by the second file identifier, the data processing system comprising:

a data storage medium; and storage management means coupled to the host processor for instructing the host processor to perform a machine-executed comparison of the management criteria of the first and second files with the management attributes of the first and second files respectively, and if the comparison so determines, to transfer the first file to the file space, and assign the first file a first unique name within the file space, the first unique name including the first file identifier, the first file pool identifier, and the operating system identifier for the one of a plurality of operating systems which controls the first file pool, to transfer the second file to the file space and assigning the second file a second unique name within the file space, the second unique name different than the first unique name and including the second file identifier, the second file pool identifier, and the operating system identifier for the one of a plurality of operating systems which controls the second file pool, and to update the management attributes of the first and second files accordingly.

3. A data storage hierarchy comprising:

a user interface permitting user specification of a first file having a first file name and of a second file having a second file name;

at least one level 0 peripheral storage device including storage space for a first file pool and a second file pool each under the control of one of a plurality of operating systems, each operating system assigned a different operating system identifier, the first file pool assigned a first file pool identifier unique to the one of a plurality of operating systems which controls the first file pool, the second file pool assigned a second file pool identifier unique to the one of a plurality of operating systems which controls the second file pool, the first file pool including the first file, the first file assigned a first file identifier unique to the first file pool and different than the first file name, the second file pool including the second file, the second file assigned a second file identifier unique to the second file pool and different than the second file name, the first file identifier identical to the second file identifier;

a level 1 peripheral storage device including storage space for a shared file thereon, the level 1 peripheral storage device having greater storage capacity and lower performance relative to said at least one level 0 peripheral storage device;

a host processor coupled to the user interface and the level 0 and level 1 peripheral storage devices, the host processor having access to a first catalog storing management criteria and management attributes for the first file, the first file identified in the first catalog by the first file identifier, the host processor also having access to a second catalog storing management criteria and management attributes for the second file, the second file identified in the second catalog by the second file identifier; and storage management means coupled to the host processor for instructing the host processor to perform a machine-executed comparison of the management criteria of the first and second files with the management attributes of the first and second files respectively, and if the comparison so determines, to transfer the first file to the file space and assign the first file a first unique name within the file space, the first unique name including the first file identifier, the first file pool identifier, and the operating system identifier for the one of a plurality of operating systems which controls the first file pool to transfer the second file to the file space and assigning the second file a second unique name within the file space, the second unique name different than the first unique name and including the second file identifier, the second file pool identifier, and the operating system identifier for the one of a plurality of operating systems which controls the second file pool, and to update the management attributes of the first and second files accordingly.

4. The data storage hierarchy of claim 3 wherein the first and second file pools are controlled by different operating systems.

5. The data storage hierarchy of claim 3 further comprising a plurality of collections of operating systems, each operating system identifier unique to the collection of operating systems in which each operating system resides.

6. The data storage hierarchy of claim 5 further comprising a plurality of subnetworks each including a plurality of collections of operating systems, each collection assigned a collection identifier unique to the subnetwork in which each collection resides, the collection identifier for the collection including the one of a plurality of operating systems which controls the first file pool also used by the storage management means to create the first unique name.

7. The data storage hierarchy of claim 6 further comprising a subnetwork identifier unique to the network in which the subnetwork resides, the subnetwork identifier for the subnetwork including the collection which includes the one of a plurality of operating systems which controls the first file pool also used by the storage management means to create the first unique name.

* * * * *